US007996261B1

(12) United States Patent
Waelbroeck et al.

(10) Patent No.: US 7,996,261 B1
(45) Date of Patent: Aug. 9, 2011

(54) SYSTEMS AND METHODS FOR INCREASING PARTICIPATION OF LIQUIDITY PROVIDERS ON CROSSING SYSTEM

(75) Inventors: Henri Waelbroeck, Scarsdale, NY (US); Brent Gamse, Glencoe, IL (US); Fred J. Federspiel, Larchmont, NY (US)

(73) Assignee: Pipeline Financial Group, Inc., New York, NY (US)

( * ) Notice: Subject to any disclaimer, the term of this patent is extended or adjusted under 35 U.S.C. 154(b) by 1027 days.

(21) Appl. No.: 11/804,525

(22) Filed: May 17, 2007

Related U.S. Application Data

(60) Provisional application No. 60/808,103, filed on May 23, 2006.

(51) Int. Cl.
*G06Q 30/00* (2006.01)
(52) U.S. Cl. ...................................... 705/14.1
(58) Field of Classification Search .................. 705/14.1
See application file for complete search history.

(56) References Cited

U.S. PATENT DOCUMENTS

| 7,136,834 | B1 | 11/2006 | Merrin et al. | |
|---|---|---|---|---|
| 2004/0088242 | A1* | 5/2004 | Ascher et al. | 705/37 |
| 2005/0102218 | A1* | 5/2005 | Sargent et al. | 705/37 |

OTHER PUBLICATIONS

EP Appln. No. 05729202 Supplementary European Search Report, Feb. 5, 2008.
Domowitz I: "A Taxonomy of Automated Trade Execution Systems", Journal of International Money and Finance of Butterworth Scientific, Guildford, GB, vol. 12, 1993, pp. 607-632.
Hendershott T: "Electronic Trading in Financial Markets", IT Pro, Jul./Aug. 2003, pp. 10-14.
Madden, Bartley J.; *Structural Changes in Trading Stocks*; The Journal of Portfolio Management; 1993, No. 10093; pp. 19-27.

* cited by examiner

*Primary Examiner* — Daniel Lastra
(74) *Attorney, Agent, or Firm* — Cowan, Liebowitz & Latman; Steven D. Underwood

(57) ABSTRACT

In one aspect, the invention comprises a system for enabling a crossing system operator to calculate a rebate payment to a second participant for executing the block order of a first participant based on at least one of: (a) a difference between a benchmark price and an execution price of the block order; (b) total volume of block execution; and (c) an amount that decays exponentially with the time between the first participant's order and the order's execution by a liquidity provider.

19 Claims, 2 Drawing Sheets

SYSTEMS AND METHODS FOR INCREASING PARTICIPATION OF LIQUIDITY PROVIDERS ON CROSSING SYSTEM

CROSS REFERENCE TO RELATED APPLICATIONS

This application claims priority to U.S. Provisional Patent Application No. 60/808,103, filed May 23, 2006. The entire contents of that provisional application are incorporated herein by reference.

BACKGROUND AND SUMMARY

Crossing systems designed to enable the execution of large block orders encounter the difficulty of focusing liquidity at the same point in price and time. Various solutions to this problem have been deployed. Various electronic markets offer scheduled crosses at specific points in the day. For example, Pipeline and LiquidNet attempt to attract crossing blocks at any time of the day by delivering invitations to trade to potential counter-parties and offering mechanisms to facilitate convergence in price. These methods succeed only to the extent that large buyers and sellers have latent liquidity ready to be routed to the market and not previously committed to another strategy. As a result, fill rates on orders committed to crossing systems are low, typically 1-5% depending on the stock's liquidity.

To bridge the gap in time and strategies, liquidity providers willing to commit capital can take on a position on the crossing system and wind it down at a different time or using a different strategy. However, the price of the block trade on the crossing system then becomes a principal driver of profitability for the liquidity provider, creating a direct conflict of interest with the institution that had committed its block order to the crossing system. The liquidity provider has an incentive to game the execution price on the crossing system by buying the block lower and retaining the difference as part of its trading profit.

Crossing systems have devised various mechanisms to prevent potential damage to their customers' interests. Liquid-Net simply precludes the participation of liquidity providers. Pipeline protects the institutional order's interests via a large minimum quantity, hiding the side, using orange and yellow indicators to give an informational edge to resident aggressive orders, fuzzying the time when these indicators are turned on or off, and enabling an order's limit price and time in force to remain unknown. POSIT randomizes the execution time.

Of these systems, only POSIT enables liquidity providers to participate profitably, but it falls short in protecting the institutional order, as liquidity providers can probe the crossing system with small quantities to discover an imbalance in large buy/sell interest and later trade accordingly on the continuous market. Pipeline's rules, in contrast, have proven themselves to be effective at protecting the resident order, with the result that liquidity providers acting on a regular commission-based pricing model have not found it profitable to trade on the system, even when their commissions are reduced all the way to zero.

Standard rebate models such as those used by ECNs provide a negative commission, typically limited to $0.002 per share. These payments are too small to cover adverse information costs associated with large block orders. To the extent that they could be raised to a level sufficient to attract liquidity providers to larger blocks, one would still be faced with a strong incentive to find ways to game the crossing system's pricing mechanism. The solutions described above would be only an imperfect remedy, likely to diminish but not eliminate the damage caused by predators looking to game the execution price.

What is needed is a mechanism for providing rebate payments that enables liquidity providers to participate and raise crossing rates dramatically, while neutralizing the incentive to game the execution price on the block crossing system.

Embodiments of the subject invention relate to software-based systems and methods for encouraging capital providers to facilitate trades with good execution quality on a block trading system.

Embodiments of the system subject of the present invention overcome the limitations of known liquidity rebate payment systems by calculating rebate payments in a manner that neutralizes (preferably, exactly neutralizes) the incentive to game the execution price on a block crossing system.

The combination of higher crossing rates and execution quality provides a strong value proposition to the user, thereby enabling the crossing system that uses this rebate mechanism to strengthen customer loyalty and sustain a premium price that can be used to offset the cost of the rebate mechanism.

In one aspect, the invention comprises a system for enabling a crossing system operator to calculate a rebate payment to a second participant for executing the block order of a first participant based on at least one of: (a) a difference between a benchmark price and an execution price of the block order; (b) total volume of block execution; and (c) an amount that decays exponentially with the time between the first participant's order and the order's execution by a liquidity provider.

In another aspect, the invention comprises a system for enabling a crossing system operator to calculate a rebate payment to a first participant upon execution by a second participant of an order placed by the first participant, based on at least one of: (a) a difference between a benchmark price and an execution price of the block order; (b) total volume of the block execution; and (c) an amount that decays exponentially with a time between the first participant's order and the order's execution by a liquidity provider.

DETAILED DESCRIPTION OF CERTAIN EMBODIMENTS

Figure 1:
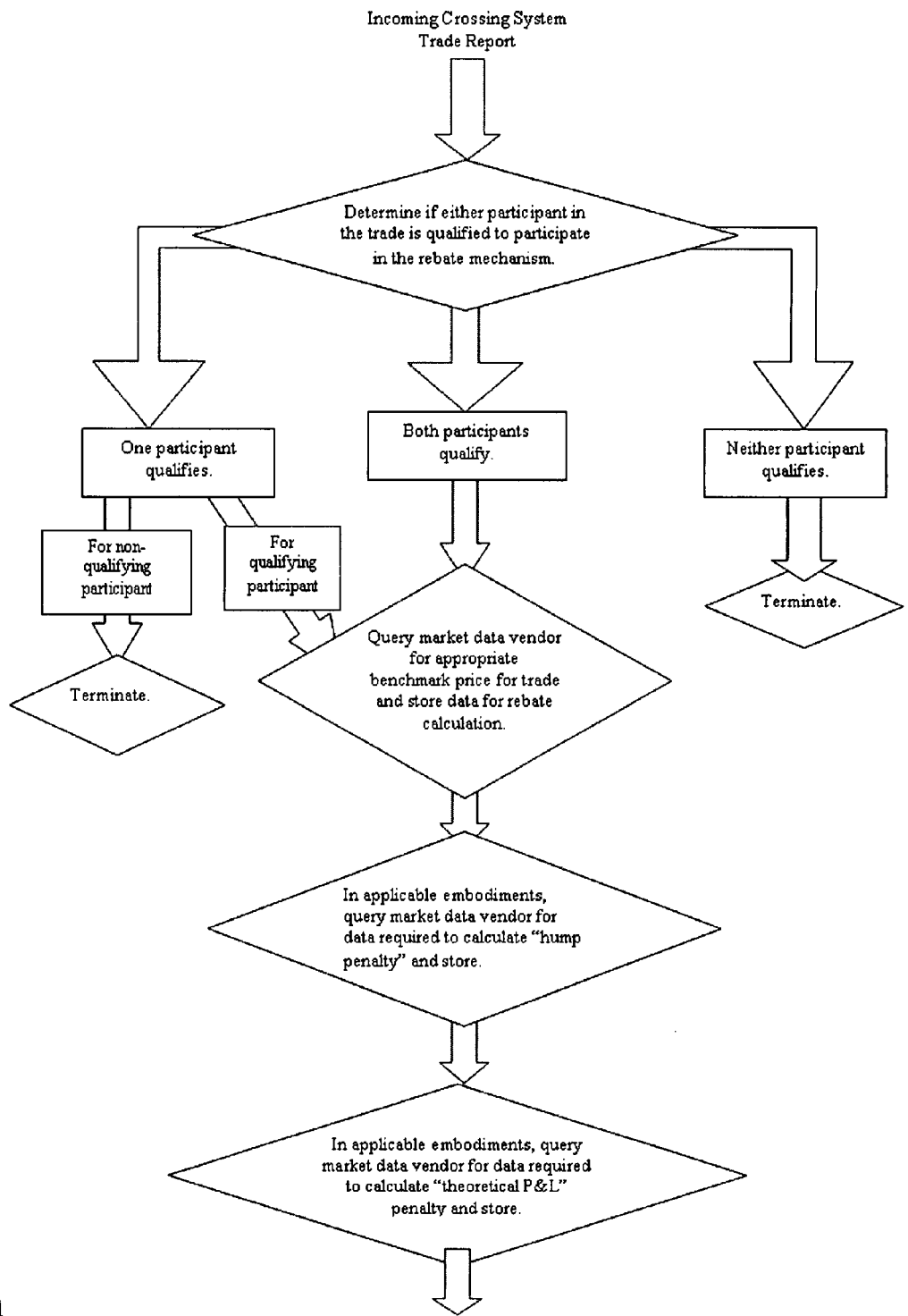
FIGS. 1 and 2 depict steps performed by an embodiment.

Embodiments of the invention rely on adopting a benchmark price against which the price of a trade on the crossing system can be measured. This can be, for example, the volume-weighted average price (VWAP) of all tape-reported prints in a window covering five times the block quantity before and after the print, truncated to the market open and close times if needed.

Alternatively, the benchmark price can be the daily VWAP (well-known in the art), or available VWAP (from the time of the trade to the end of day), or in a time window such as 10 minutes before and after the trade. Other benchmark prices will be apparent to those skilled in the art. In an embodiment aimed at deterring benchmark gaming, the system randomly assigns any one of several benchmark prices to each trade.

A crossing network operator preferably offers an execution quality rebate that equals the difference, for each execution, between the block's value at the actual execution price and its value at the benchmark price:

Rebate=(Block Price−Benchmark Price)

Absent this rebate, the liquidity provider's profitability is determined by the difference between the actual execution price and the price at which the position will be sold. So the net profitability PL of the liquidity provider's strategy for a block bought on the crossing system and sold elsewhere, including the execution quality rebate, is:

$$PL = (\text{Sell Price} - \text{Block Price}) + (\text{Block Price} - \text{Benchmark Price})$$
$$= \text{Sell Price} - \text{Benchmark Price}$$

The net effect of the rebate payments, therefore, is to replace the trade price with the benchmark price for the liquidity provider, while maintaining the benefit of an in-line execution price at the time of the trade for the institutional user.

The value proposition to the liquidity provider is to exploit the option of executing or not executing an order in the crossing system depending upon their ability to unwind on the market at better-than-benchmark prices. Strategies to exploit such an option are described below.

There are at least two sources of profits for the liquidity provider. (1) If a stock's price has just come down sharply, the current market price is below the trailing average price and therefore is relatively likely to end up below the Benchmark price. So if the price drop is robust, there could be an opportunity to sell the block on the crossing network and buy it back at below-benchmark prices. (2) If a stock is trading in a range, one can adopt a range trading strategy on the continuous market, buying at the low end of the range and selling near the high, and use the crossing system to "stop" the position should the stock break out of its range.

Even without knowing the side or even having the certainty that the order exists on the crossing system, the possibility of a stop suffices to provide a statistical edge over a standard range-trading strategy. Indeed, if one believes that markets are efficient at balancing the profitability of range trading strategies against the risk of loss in the event of a breakout, the partial stop advantage suffices to break this balance in favor of the liquidity provider. The end result is either better-than-benchmark executions of the institutional order, or nothing, insofar as the crossing system is concerned.

For the institutional order, greater fill rates will occur after favorable price movements (buying after the price has dropped), a strategy that is generally beneficial to their interests to the extent that institutions typically have more to do than they commit at any one time, and therefore tend to tilt the balance in favor of mean reversion when market moves run into their trading interest. The cost of providing the rebates must be passed on to the user, but to the extent that the crossing system's fill rates are substantially higher than without the present invention, users will find it to their interest to accept a higher commission in order to get a quick fill on a large order, and indirectly benefit from the skill of sophisticated liquidity providers at unwinding large positions with very little market impact. Therefore, all parties are benefited by the present invention.

In an embodiment aimed at limiting the cost to the crossing system, in the event that the liquidity provider were to finance excessively generous fills on the system and recover the losses through the rebate mechanism at the end of the month, the rebate is reduced by a penalty term that discourages prints that are too generously priced compared to the price during the time period after the trade, long enough to see 5 times the block quantity on the tape, hereinafter called "Post Trade Price." The theoretical P&L of a trade may be defined as (again taking the example of a block bought on the crossing system):

Theoretical $PL$=(Post Trade Price-Block Price)

Theoretical $PL$ Penalty=$F$(Theoretical $PL$ Per Share), where (in $ per share)

$F(x)$=0 for $x$>=−0.03

$x$/0.15 for −0.15<$x$<−0.03

1 for $x$<−0.15

Rebate=(Block Price-Benchmark Price)−Theoretical $PL$ Penalty.

In an alternate embodiment, the loss is expressed in relative terms rather than in cents, by considering the price difference in basis points, as is known in the art.

In an embodiment aimed to discourage the practice of market timing or peg gaming, the system further measures the range of prices printed to the tape in an interval before and after the trade, where each interval is the greater of 10 minutes or the time needed to see as many shares printed to the tape as the block quantity, and determines whether the block trade is in the lower third of both ranges. If that is the case, the price difference between the block price and the average price in the intervals before and after is assessed as a penalty in the rebate:

Hump Penalty=Block Price−(Before Price+After Price)/2.

Combining this with the above mentioned penalty, one arrives at:

Rebate=(Block Price−Benchmark Price)−Theoretical $PL$ Penalty−Hump Penalty.

In another embodiment, the rebate is incremented by a conventional per share volume rebate to encourage further activity by liquidity providers.

In another embodiment, the rebate is incremented by an immediacy rebate that starts at a given per share amount and decays exponentially with the time elapsed since the order arrived in the crossing system, where the decay timescale is the time it takes for an amount of shares equal to one block quantity to print to the tape based on the stock's average daily volume. The initial per share amount is preferably set independently for each stock to an amount that reflects the risk associated with holding a block position in the stock, such as the standard deviation of the stock (in cents) over the above timescale. Alternatively, the initial per share amount of the immediacy rebate is determined empirically to stimulate the desired level of activity by liquidity providers, and published to participating liquidity providers. If a liquidity provider is involved in multiple block trades in the same symbol in the course of the day, the immediacy rebate is preferably counted only on the first block:

Rebate=(Block Price−Benchmark Price)−Theoretical $PL$ Penalty−Hump Penalty+Volume Rebate+ Immediacy Rebate.

In an embodiment aimed at eliminating the incentive for adverse market timing system-wide, the system awards the execution quality rebate to all crossing system participants whose overall volume surpasses a specified level.

In a further embodiment, the system awards the execution quality rebate to all crossing system participants. In this embodiment, the executions effectively take place at the benchmark price, but are reported at the market price at the time of the execution and effectively re-priced later through the rebate mechanism to avoid the technical difficulties for locking-in trades in an order management system at a price to be determined in the future.

Figure 2:
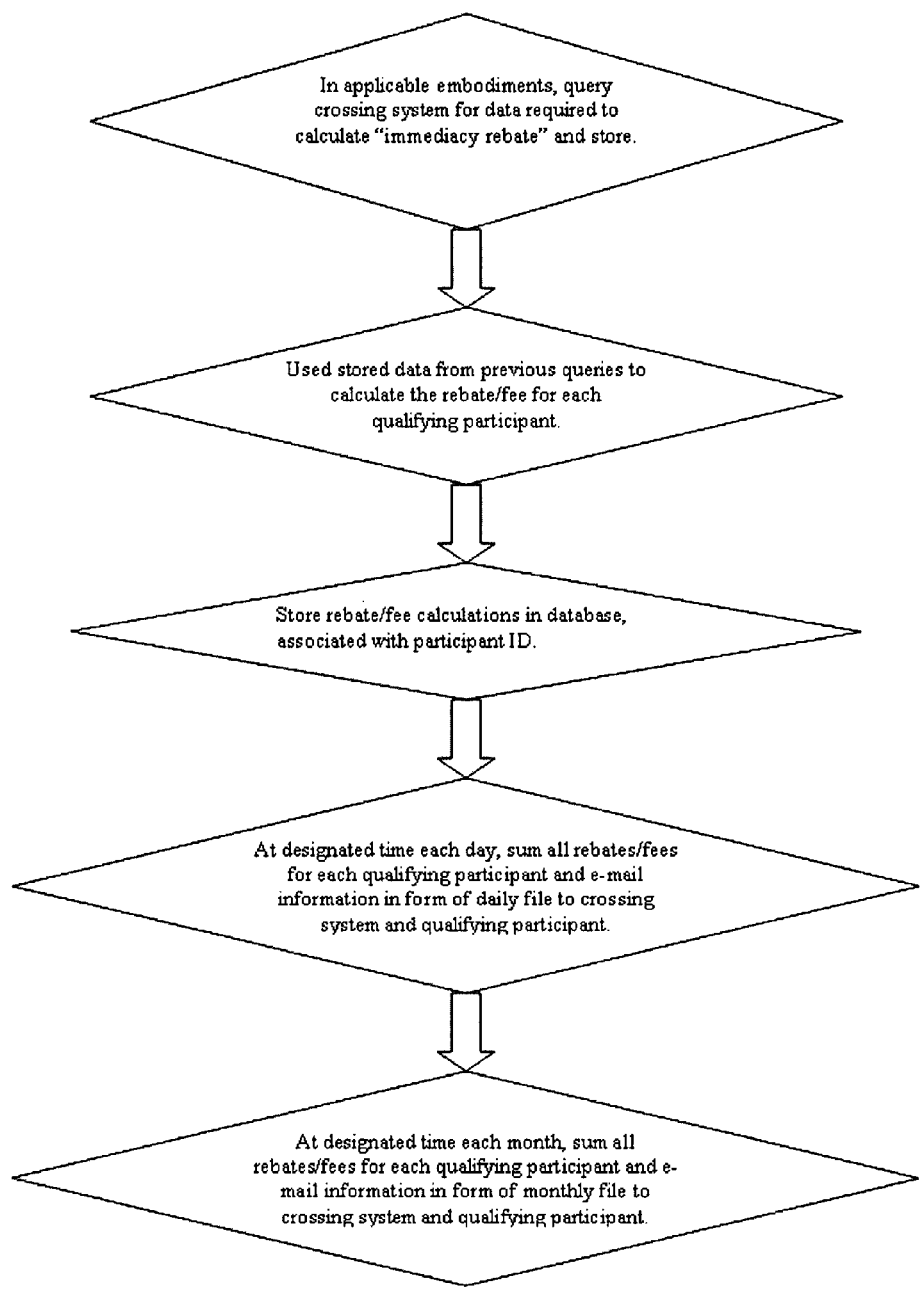

Steps performed by an embodiment of the invention are depicted in FIGS. 1 and 2.

It will be appreciated that the present invention has been described by way of example only, and that improvements and modifications may be made to the invention without departing from the scope or spirit thereof.

The invention claimed is:

1. A computer system for enabling a a rebate payment to a second participant for executing a block order of a first participant, said system comprising:
   a processor that calculates a benchmark price for said block order;
   a processor that calculates an execution price for said block order; and
   a processor that receives results of said benchmark price and execution price calculations and calculates a difference between a benchmark price and an execution price of said block order;
   a processor that calculates, based on said difference between a benchmark price and an execution price, a rebate payment to be paid to said second participant; and
   a processor that transmits said rebate payment to said second participant;
   wherein said processors may be the same processor, separate processors, or combinations thereof.

2. A computer system as in claim 1,
   wherein said processor that receives results of said benchmark price and execution price calculations and calculates a difference between a benchmark price and an execution price of said block order further calculates an amount that decays exponentially with a time elapsed between said first participant's order being received and said order's execution by a liquidity provider, and
   wherein calculation of said rebate payment is further based on said calculated amount that decays exponentially with a time between said first participant's order and said order's execution by a liquidity provider.

3. A computer system as in claim 1,
   wherein said processor that receives results of said benchmark price and execution price calculations and calculates a difference between a benchmark price and an execution price of said block order further calculates total volume of block execution, and
   wherein calculation of said rebate payment is further based on said calculated total volume of execution.

4. A computer system as in claim 1, wherein calculation of said rebate payment is further based on a calculation of theoretical net profitability.

5. A computer system as in claim 4, wherein calculation of said theoretical net profitability is based on a difference between a post trade price and a block price.

6. A computer system as in claim 1, wherein calculation of said rebate payment is further based on a calculation of a theoretical net profitability penalty.

7. A computer system as in claim 6, wherein calculation of said theoretical net profitability penalty is based a calculation of theoretical net profitability per share of said block order.

8. A computer system as in claim 7, wherein said calculation of theoretical net profitability per share of said block order is performed in terms of dollars per share.

9. A computer system as in claim 7, wherein said calculation of theoretical net profitability per share of said block order is performed in terms of basis points.

10. A computer system as in claim 1, wherein said rebate price is further based on a theoretical net profitability penalty.

11. A computer system as in claim 6, wherein said rebate payment is based on: execution price—benchmark price—theoretical net profitability penalty—hump penalty;
    wherein said hump penalty is expressed as a difference between execution price and an average of prices in time intervals before and after execution of said block order.

12. A computer system as in claim 11, wherein said rebate payment is further based on a volume rebate and an immediacy rebate.

13. A computer system as in claim 1, wherein said rebate payment is further based on a volume rebate and an immediacy rebate.

14. A computer system as in claim 1, wherein said rebate payment is further based on an execution quality rebate.

15. A computer system as in claim 1, wherein said rebate payment is reduced by an amount proportional to time elapsed since said block order was received by said computer system.

16. A computer system as in claim 1, wherein execution price of said block order is at said benchmark price, said execution price is reported as being at market price at the time of execution, and said block order is effectively re-priced at a later time via said rebate.

17. A computer system as in claim 1,
    wherein said processor that receives results of said benchmark price and execution price calculations and calculates a difference between a benchmark price and an execution price of said block order further calculates an amount that decays exponentially with a time elapsed between said first participant's order being received and said order's execution by a liquidity provider, and
    wherein said rebate payment is further based on said calculated amount that decays exponentially with a time between said first participant's order and said order's execution by a liquidity provider.

18. A computer system as in claim 1,
    wherein said processor that receives results of said benchmark price and execution price calculations and calculates a difference between a benchmark price and an execution price of said block order further calculates total volume of block execution, and
    wherein said rebate payment is further based on said calculated total volume of execution.

19. A computer system for enabling a rebate payment to a first participant upon execution by a second participant of a block order placed by said first participant, said system comprising:
    a processor that calculates a benchmark price;
    a processor that calculates an execution price of said block order; and
    a processor that receives results of said benchmark price and execution price calculations and calculates a difference between a benchmark price and an execution price of said block order;
    a processor that calculates, based on said difference between a benchmark price and an execution price, a rebate payment to be paid to said first participant; and
    a processor that transmits said rebate payment to said first participant.
    wherein said processors may be the same processor, separate processors, or combinations thereof.

* * * * *